United States Patent [19]
Mochizuki

[11] Patent Number: 5,661,358
[45] Date of Patent: Aug. 26, 1997

[54] DEMODULATION APPARATUS AND COMMUNICATION SYSTEM USING THE SAME

[75] Inventor: Norihiro Mochizuki, Machida, Japan

[73] Assignee: Canon Kabushiki Kaisha, Tokyo, Japan

[21] Appl. No.: 543,255

[22] Filed: Oct. 18, 1995

Related U.S. Application Data

[63] Continuation of Ser. No. 193,402, Feb. 7, 1994, abandoned.

[30] Foreign Application Priority Data

Feb. 8, 1993 [JP] Japan .................................. 5-041739

[51] Int. Cl.$^6$ ..................................... H01L 41/08
[52] U.S. Cl. ................... 310/313 D; 310/313 R; 310/313 B; 364/821
[58] Field of Search .............. 310/313 R, 313 B, 310/313 D; 364/821; 353/153, 154, 195

[56] References Cited

U.S. PATENT DOCUMENTS

| | | | |
|---|---|---|---|
| 5,003,213 | 3/1991 | Mochuzuki et al. | 310/313 D |
| 5,164,628 | 11/1992 | Egara et al. | 310/313 |
| 5,185,548 | 2/1993 | Egara et al. | 310/313 D |
| 5,200,663 | 4/1993 | Mochizuki et al. | 310/313 |

FOREIGN PATENT DOCUMENTS 0369375  5/1990  European Pat. Off. .

Primary Examiner—Mark O. Budd
Attorney, Agent, or Firm—Fitzpatrick, Cella, Harper & Scinto

[57] ABSTRACT

A demodulation apparatus and a communication system using the same are disclosed. The apparatus comprises code generation means for generating a reference spread code corresponding to a first signal modulated by a spread code, and an elastic surface wave element for receiving the first signal and a second signal output from the code generation means, and outputting a demodulated information signal. The elastic surface wave element comprises a piezoelectric substrate, a first excitation electrode, formed on the piezoelectric substrate, for generating a first elastic surface wave which propagates in a predetermined direction in accordance with the first signal, a second excitation electrode, formed on the piezoelectric substrate, for generating a second elastic surface wave which propagates in a direction opposite to the predetermined direction in accordance with the second signal, and an acousto-electric converter, formed between the first and second excitation electrodes on the piezoelectric substrate, for outputting a convolution signal of the first and second signals on the basis of the first and second elastic surface waves, wherein the acousto-electric converter selectively converts an elastic surface wave having a wave number twice a wave number of the first and second elastic surface waves into an electrical signal.

21 Claims, 11 Drawing Sheets

DATA "1"

DATA "0"

5,661,358

DEMODULATION APPARATUS AND COMMUNICATION SYSTEM USING THE SAME

This application is a continuation, of application Ser. No. 08/193,402 filed Feb. 7, 1994, now abandoned.

BACKGROUND OF THE INVENTION

1. Field of the Invention

The present invention releases to an apparatus for demodulating an information signal and, more particularly, to a demodulation apparatus suitable for demodulating a signal modulated by spread spectrum modulation and a communication system using the same.

2. Related Background Art

A spread spectrum communication is a communication for transmitting an information signal by spreading the information signal to a sufficiently wide bandwidth, and has the following features. That is, the spread spectrum communication allows code divided multiplexing, discriminates strongly against a disturbance, has a high privacy function, and so on.

In reception processing of the spread spectrum communication, an information signal is demodulated by executing so-called inverse spreading processing for correlating spread codes assigned to respective channels with a received signal. Conventionally, a receiver of the spread spectrum communication is divided into a synchronization unit and a demodulation unit. The synchronization unit achieves synchronization by a sliding correlation method for detecting a correlation between received spread codes and reference spread codes having a bit rate slightly different from that of the received spread codes.

As a system capable of high-speed synchronous acquisition, a system using a convolver is known. The convolver is a convolution arithmetic element, and serves as a correlator when one of two input signals is set to be a temporally inverted signal. More specifically, when a received signal is input as one of input signals to the convolver, and a signal obtained by temporally inverting the received signal is input as the other input signal, the two signals coincide with each other at a certain timing, and generate a sharp peak output. In particular, if spread codes used in this case are those with good auto-correlation characteristics, a sharp peak output is generated only when the two signals coincide with each other; otherwise, almost no output appears. As one of convolvers, an elastic surface wave convolver is known. The elastic surface wave convolver is effective for high-speed transmission since it is an analog arithmetic element, and can execute signal processing in real time.

FIG. 1 shows a conventional spread spectrum receiver using an elastic surface wave convolver. Referring to FIG. 1, the receiver comprises first and second frequency converters 2 and 4, an elastic surface wave element (convolver) 5, a filter (F) 6, a detector (D) 10, a peak detection circuit (PD) 8, and code generators (CG) 3 and 9. A received signal 1 is converted into an intermediate frequency by the frequency converter 2, and is input to the elastic surface wave element 5. The code generator 3 generates codes obtained by temporally inverting spread codes of the received signal as reference spread codes, and inputs these codes to the elastic surface wave element 5 via the frequency converter 4.

The elastic surface wave element 5 comprises first and second excitation electrodes 102 and 103 for exciting an elastic surface wave on a piezoelectric substrate 101, and a rectangular output electrode 105 arranged between the first and second excitation electrodes 102 and 103.

Each of the first and second frequency converters 2 and 4 comprises an oscillator 15, a multiplier 13, and a filter (F) 14.

When the received signal 1 is input to the first excitation electrode 102, and the output from the code generator 3 is input to the second excitation electrode 103, a first elastic surface wave excited by the first excitation electrode 102 and a second elastic surface wave excited by the second excitation electrode 103 overlap each other on the output electrode 105 while propagating in opposite directions. Since the displacement and potential of a product of the two elastic surface waves are generated on the substrate 101 to have a frequency twice that of the input signal and a wave number=0 by the parametric mixing phenomenon of the two overlapping elastic surface waves, the output electrode 105 can extract the overlapping elastic surface waves as an electrical signal by integrating them within the range of the output electrode. Therefore, the elastic surface wave element 5 generates a sharp peak output at a center frequency $2f$ (where f is the center frequency of the input signal) when the two elastic surface waves coincide with each other. This output is extracted via the filter 6, and is envelope-detected by the detector 10. Thereafter, the output from the detector 10 is subjected to peak detection by the peak detection circuit 8. On the basis of peak information obtained by the peak detection circuit 8, the generation timing of the reference spread codes to be generated by the code generator 3 is adjusted, so that the reference spread codes generated by the code generator 3 coincide with the received signal on the elastic surface wave element 5 in a desired state, thus synchronizing the codes.

The above-mentioned peak information is also input to the code generator 9 for generating the same spread codes as those of the received signal. When the code generator 9 generates spread codes in synchronism with the received signal, and a multiplier 11 multiplies the generated codes with the received signal, the received signal modulated by spread spectrum modulation is inversely spread. Since the inversely spread signal is a modulated signal modulated by frequency modulation, phase modulation, or the like, which is normally used, the signal is demodulated via a conventional demodulator (DM) 12.

However, in the prior art described above, the output from the elastic surface wave element is used only for synchronizing codes, and the demodulation unit must be arranged in addition to the synchronization unit, resulting in a large circuit scale.

On the other hand, Nakagawa et al. "dc effects in elastic surface waves", Applied Physics Letters, Vol. 24, No. 4, pp. 160–162, 15 Feb. 1974 discloses an elastic surface wave element shown in FIG. 2. Referring to FIG. 2, input interdigital transducers 17 and 18, and an output interdigital transducer 19 are formed on a piezoelectric substrate 16. When a pulse signal having a wave number=k and a frequency=$\omega$ is input to the transducer 17, and a pulse signal having a wave number=−k and a frequency=$\omega$ is input to the transducer 18, the two transducers 17 and 18 generate elastic surface waves which propagate in opposite directions. These elastic surface waves cause an interaction on a region between the transducers 17 and 18, and a signal having a wave number=2k and a frequency=0 is extracted from the output transducer 19 by a nonlinear effect.

SUMMARY OF THE INVENTION

It is an object of the present invention to provide a demodulation apparatus capable of demodulating a signal demodulated by spread codes by a simple arrangement, and a communication system using the demodulation apparatus. More specifically, the present invention facilitates data demodulation by utilizing the element disclosed in the reference of Nakagawa et al. in the demodulation apparatus.

In order to achieve the above object, a demodulation apparatus according to an aspect of the present invention comprises:

code generation means for generating a reference spread code corresponding to a first signal modulated by a spread code; and an elastic surface wave element for receiving the first signal and a second signal output from the code generation means, and outputting a demodulated information signal, the elastic surface wave element comprising:

a piezoelectric substrate;

a first excitation electrode, formed on the piezoelectric substrate, for generating a first elastic surface wave which propagates in a predetermined direction in accordance with the first signal;

a second excitation electrode, formed on the piezoelectric substrate, for generating a second elastic surface wave which propagates in a direction opposite to the predetermined direction in accordance with the second signal; and an acousto-electric converter, formed between the first and second excitation electrodes on the piezoelectric substrate, for outputting a convolution signal of the first and second signals on the basis of the first and second elastic surface waves, wherein the acousto-electric converter selectively converts an elastic surface wave having a wave number twice a wave number of the first and second elastic surface waves into an electrical signal.

A demodulation apparatus according to another aspect of the present invention comprises:

code generation means for generating a reference spread code corresponding to a first signal modulated by a spread code;

a first elastic surface wave element for receiving the first signal and a second signal output from the code generation means, and outputting a demodulated information signal; and a second elastic surface wave element for receiving the first signal and the second signal output from the code generation means, and outputting a demodulated information signal, each of the first and second elastic surface wave elements comprising:

a piezoelectric substrate;

a first excitation electrode, formed on the piezoelectric substrate, for generating a first elastic surface wave which propagates in a predetermined direction in accordance with the first signal;

a second excitation electrode, formed on the piezoelectric substrate, for generating a second elastic surface wave which propagates in a direction opposite to the predetermined direction in accordance with the second signal; and an acousto-electric converter, formed between the first and second excitation electrodes on the piezoelectric substrate, for outputting a convolution signal of the first and second signals on the basis of the first and second elastic surface waves, wherein the acousto-electric converter selectively converts an elastic surface wave having a wave number twice a wave number of the first and second elastic surface waves into an electrical signal.

A communication system according to an aspect of the present invention comprises:

a transmitter for transmitting a first signal modulated by a spread code;

a receiver for receiving the first signal transmitted from the transmitter;

code generation means for generating a reference spread code corresponding to the first signal; and an elastic surface wave element for receiving the first signal received by the receiver, and a second signal output from the code generation means, and outputting a demodulated information signal, the elastic surface wave element comprising:

a piezoelectric substrate;

a first excitation electrode, formed on the piezoelectric substrate, for generating a first elastic surface wave which propagates in a predetermined direction in accordance with the first signal;

a second excitation electrode, formed on the piezoelectric substrate, for generating a second elastic surface wave which propagates in a direction opposite to the predetermined direction in accordance with the second signal; and an acousto-electric converter, formed between the first and second excitation electrodes on the piezoelectric substrate, for outputting a convolution signal of the first and second signals on the basis of the first and second elastic surface waves, wherein the acousto-electric converter selectively converts an elastic surface wave having a wave number twice a wave number of the first and second elastic surface waves into an electrical signal.

A communication system according to another aspect of the present invention comprises:

a transmitter for transmitting a first signal modulated by a spread code;

a receiver for receiving the first signal transmitted from the transmitter;

code generation means for generating a reference spread code corresponding to the first signal;

a first elastic surface wave element for receiving the first signal received by the receiver, and a second signal output from the code generation means, and outputting a demodulated information signal; and a second elastic surface wave element for receiving the first signal received by the receiver, and the second signal output from the code generation means, and outputting a demodulated information signal, each of the first and second elastic surface wave elements comprising:

a piezoelectric substrate;

a first excitation electrode, formed on the piezoelectric substrate, for generating a first elastic surface wave which propagates in a predetermined direction in accordance with the first signal;

a second excitation electrode, formed on the piezoelectric substrate, for generating a second elastic surface wave which propagates in a direction opposite to the predetermined direction in accordance with the second signal; and an acousto-electric converter, formed between the first and second excitation electrodes on the piezoelectric substrate, for outputting a convolution signal of the first and second signals on the basis of the first and second elastic surface waves, wherein the acousto-electric converter selectively converts an elastic surface wave having a wave number twice a wave number of the first and second elastic surface waves into an electrical signal.

DETAILED DESCRIPTION OF THE PREFERRED EMBODIMENTS

[First Embodiment]

Figure 1:
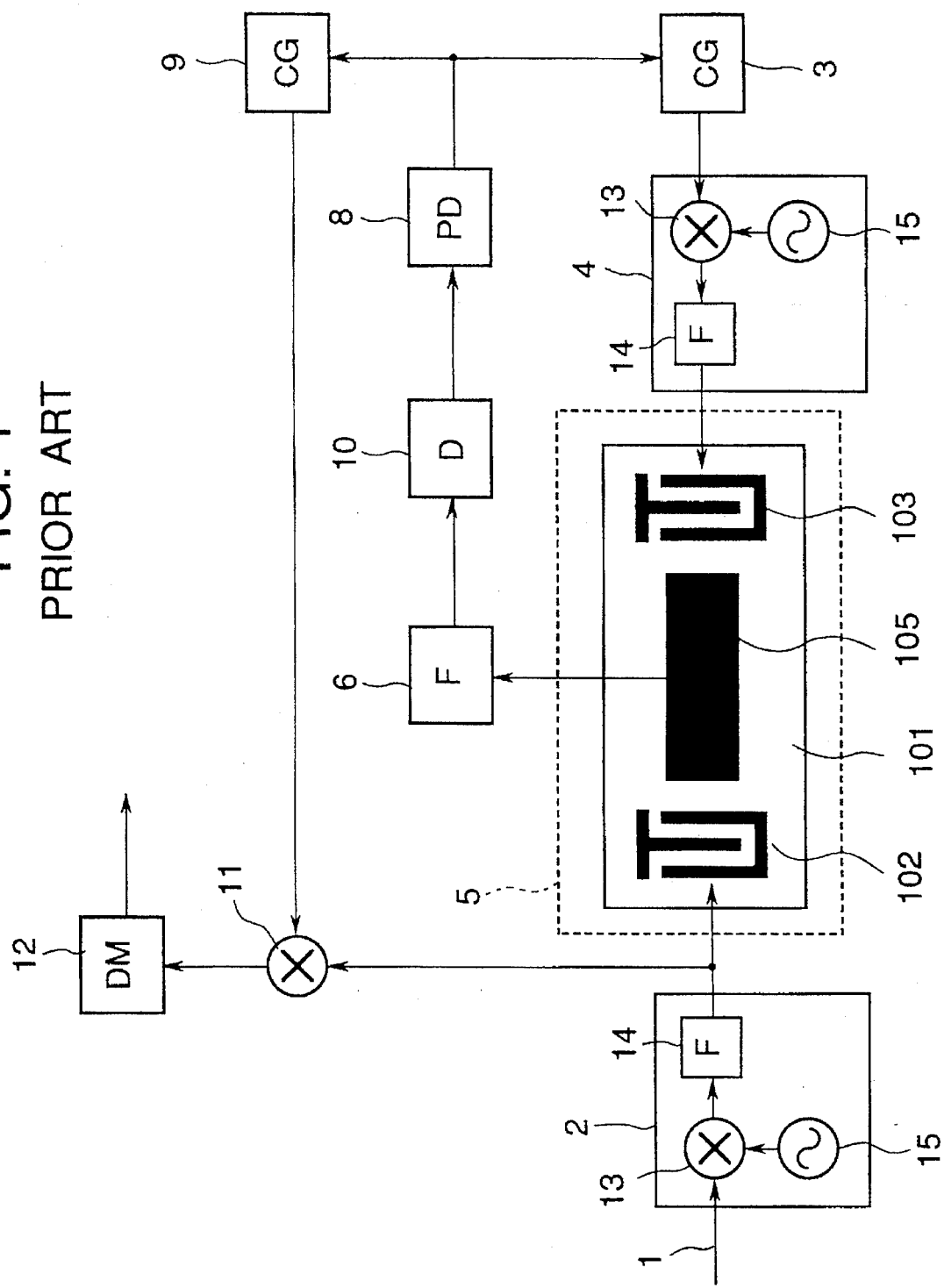
FIG. 1 is a schematic diagram showing the arrangement of a conventional demodulation apparatus.
Figure 2:
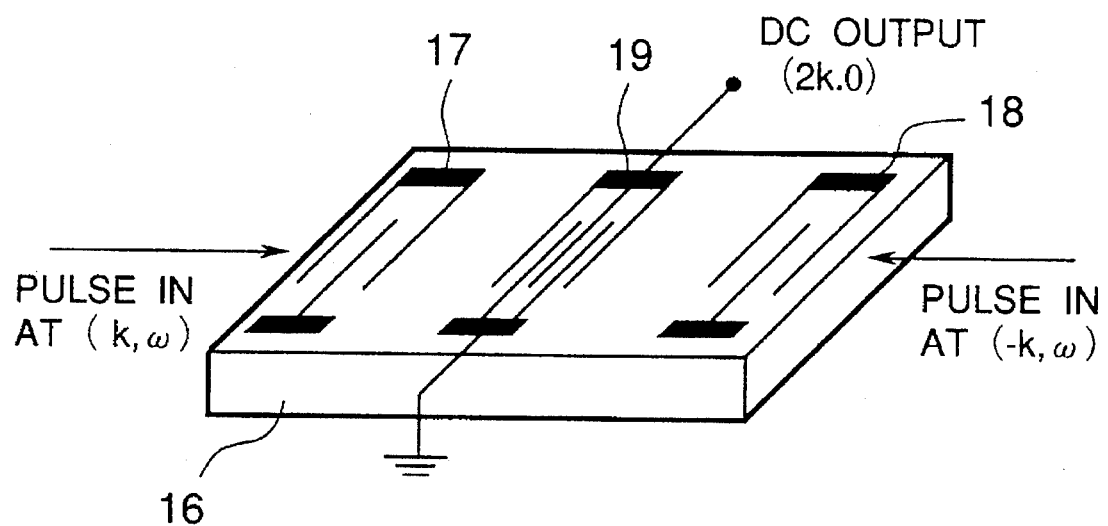
FIG. 2 is a schematic perspective view showing an example of an elastic surface wave element.
Figure 3:
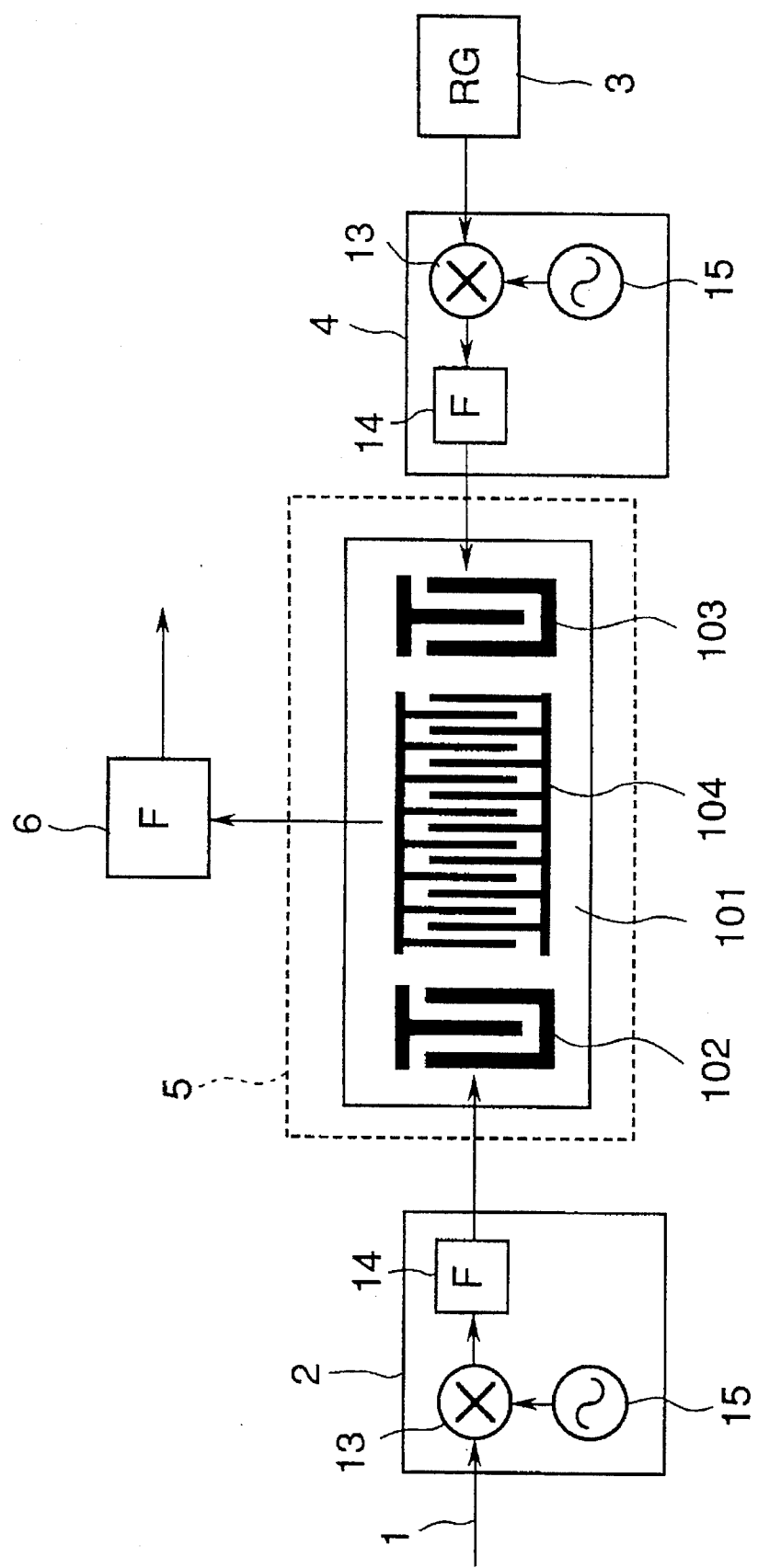
FIG. 3 is a schematic diagram showing the first embodiment of a demodulation apparatus according to the present invention.

FIG. 3 is a diagram showing the first embodiment of a demodulation apparatus according to the present invention. Referring to FIG. 3, the demodulation apparatus comprises a first frequency converter 2 for converting the frequency of a received signal 1, a reference signal generator (RG) 3 for generating a reference signal including reference codes, and a second frequency converter 4 for converting the frequency of an output signal from the reference signal generator 3. Each of the first and second frequency converters 2 and 4 comprises an oscillator 15, a multiplier 13, and a filter (F) 14.

The apparatus also comprises an elastic surface wave element (convolver) 5 for receiving the output signals from the first and second frequency converters 2 and 4, and outputting a base-band convolution signal of the two input signals. The elastic surface wave element 5 comprises a piezoelectric substrate 101, first and second excitation electrodes 102 and 103, formed on the piezoelectric substrate 101, for respectively exciting first and second elastic surface waves, and an acousto-electric converter 104 formed on a transmission path along which the first and second elastic surface waves propagate in opposite directions.

The first and second excitation electrodes 102 and 103 comprise so-called interdigital transducers, and are formed on the piezoelectric substrate 101 using a conductive film of aluminum, silver, gold, or the like. An arranging pitch $P_i$ of electrode fingers of the interdigital transducer (to be abbreviated as IDT hereinafter) is set to be substantially equal to $v/2f$ where f is the center frequency of an input signal, and v is the propagation speed of an elastic surface wave.

The acousto-electric converter 104 comprises a so-called IDT (interdigital transducer), and is formed on the piezoelectric substrate 101 using a conductive film of aluminum, silver, gold, or the like. An arranging pitch $p_o$ of electrode fingers of the IDT is set to be substantially equal to $v/4f$, i.e., ½ the pitch $p_i$ of the first and second excitation electrodes 102 and 103.

The apparatus further comprises a filter (F) 6 for extracting a desired signal from the output from the elastic surface wave element 5.

The first embodiment will be described in more detail below.

The received signal 1 received from an antenna or a cable is input to the first frequency converter 2 via a filter, an amplifier, or the like, as needed, and is converted into an operation frequency (input center frequency f) of the elastic surface wave element 5, and the converted signal is input to the first excitation electrode 102 of the elastic surface wave element 5. On the other hand, the reference signal generator 3 generates a code string obtained by temporally inverting a code string of the signal to be received, and the generated code string is converted into the operation frequency (input center frequency f) of the elastic surface wave element 5. The converted signal is input to the second excitation electrode 103 of the elastic surface wave element 5.

In the elastic surface wave element 5, a first elastic surface wave having components of the received signal 1 is excited by the first excitation electrode 102, and a second elastic surface wave having reference signal components is excited by the second excitation electrode 103. The first and second elastic surface waves propagate in opposing direction on a region between the first and second excitation electrodes 102 and 103. A product component of the two elastic surface wave signals is generated on an overlapping region of the two elastic surface waves to have a wave number twice that of the first and second elastic surface waves, and a base-band frequency by the parametric mixing effect. This effect is reported in the above-mentioned reference of Nakagawa et al. More specifically, if the first elastic surface wave is given by:

$$F(t-x/v) \exp(2\pi j f(t-x/v))$$

and, if the second elastic surface wave is given by:

$$G(t+x/v) \exp(2\pi j f(t+x/v))$$

the displacement and potential of a component given by:

$$F(t-x/v) \cdot G(t+x/v) \exp(4\pi j f x/v)$$

are generated on the overlapping region of the first and second elastic surface waves. The generated component corresponds to a signal having a carrier frequency=0 and a wave number=$4\pi f/v$. Thus, when the acousto-electric converter 104 is formed so that the pitch $P_o$ of the IDT is substantially equal to v/4f on the overlapping region of the first and second elastic surface waves, a component given by:

$$\int F(t-x/v) \cdot G(t+x/v) dx$$

that is, a convolution signal of signals F and G, is generated by the acousto-electric converter 104 as a base-band signal. This signal is extracted through the filter 6. Since the output from the filter 6 is the base-band signal, data can be easily demodulated.

Figure 4A:
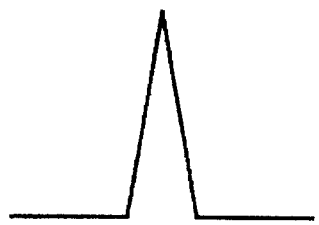
FIGS. 4A and 4B are charts showing examples of signals output from an acousto-electric converter in the demodulation apparatus of the present invention.
Figure 4B:
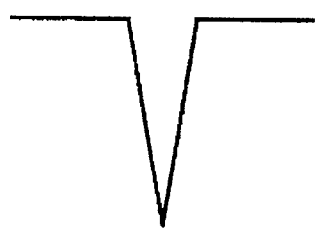

A spread spectrum communication, in particular, a direct spreading type spread spectrum communication, will be described below. In the direct spreading type spread spectrum communication, a plurality of bits are assigned to one bit of data using high-speed spread codes. When a spread spectrum signal is input as the received signal 1, if the reference signal generator 3 outputs a signal obtained by temporally inverting spread codes of the received signal, a code pattern of the received signal 1 and a code pattern output from the reference signal generator 3 periodically coincide with each other on the elastic surface wave element 5, and a peak output is obtained by the acousto-electric converter 104 at that time. The peak output is extracted via the filter 6. When the received signal 1 is modulated by two-phase phase modulation, an output signal has a positive or negative potential depending on data "1" or "0", as shown in FIGS. 4A and 4B. Therefore, by only checking if the output signal from the filter 6 is positive or negative, data "1" or "0" can easily be discriminated.

[Second Embodiment]

Figure 5:
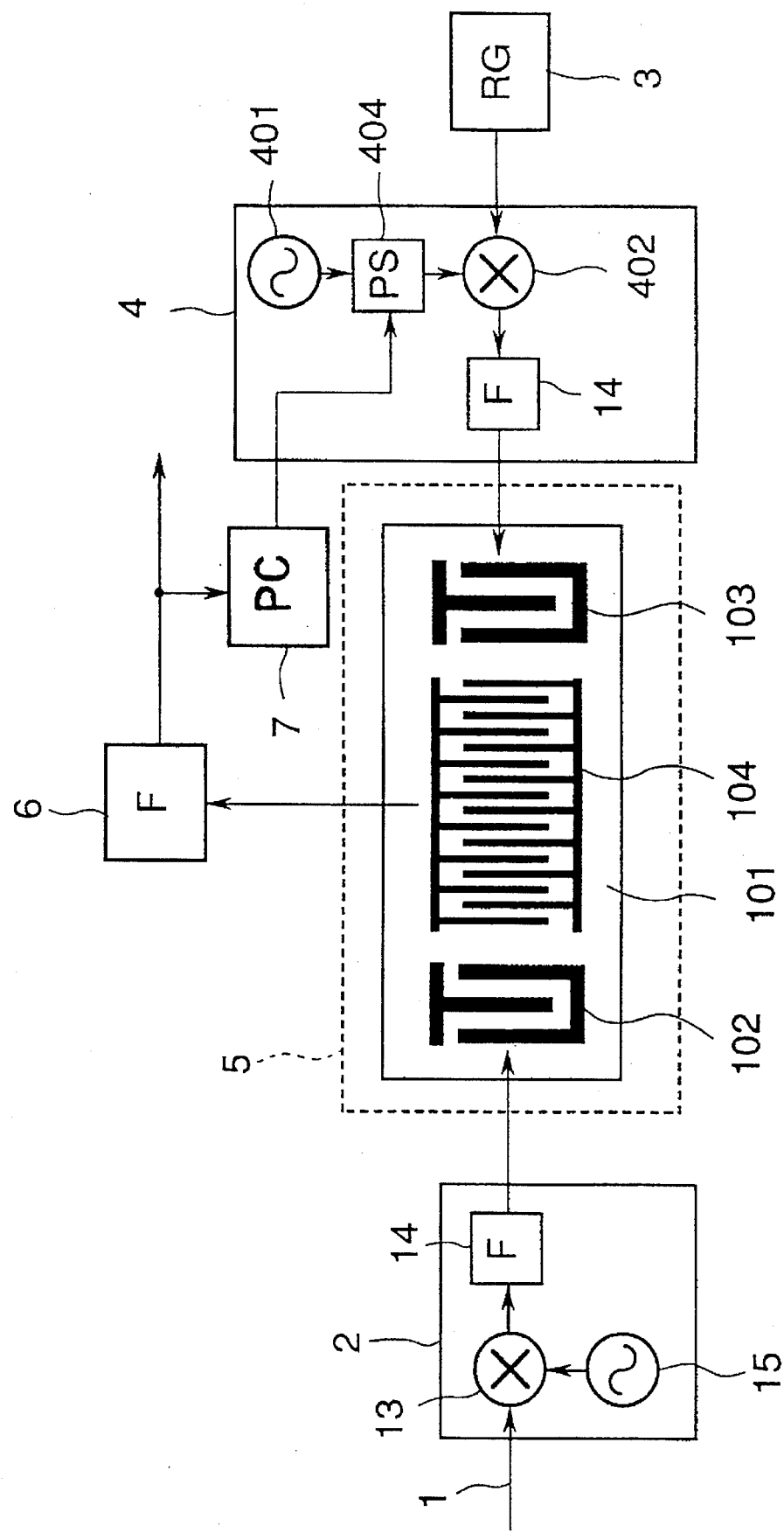
FIG. 5 is a schematic diagram showing the second embodiment of a demodulation apparatus according to the present invention.

FIG. 5 is a diagram showing the second embodiment of a demodulation apparatus according to the present invention. The same reference numerals in FIG. 5 denote the same parts as in FIG. 3. The arrangement of this embodiment is substantially the same as that in the first embodiment, except that a phase shifter (PS) 404 is arranged between an oscillator 401 and a multiplier 402 in the second frequency converter 4, the output from the filter 6 is also input to a phase control circuit (PC) 7, and the phase control circuit 7 supplies a control signal to the phase shifter 404.

In this embodiment as well, the same effect as in the first embodiment can be obtained. Furthermore, in this embodiment, since the phase of a signal to be input to the multiplier 402 can be controlled in accordance with a variation in output level of the filter 6, a stable output can be obtained by controlling the phase relationship between the first and second elastic surface waves propagating on the acousto-electric converter 104 of the elastic surface wave element 5.

In this embodiment, the phase shifter 404 is arranged in the second frequency converter 4. However, the same effect as described above can be obtained when a phase shifter is arranged in the first frequency converter 2.

[Third Embodiment]

Figure 6:
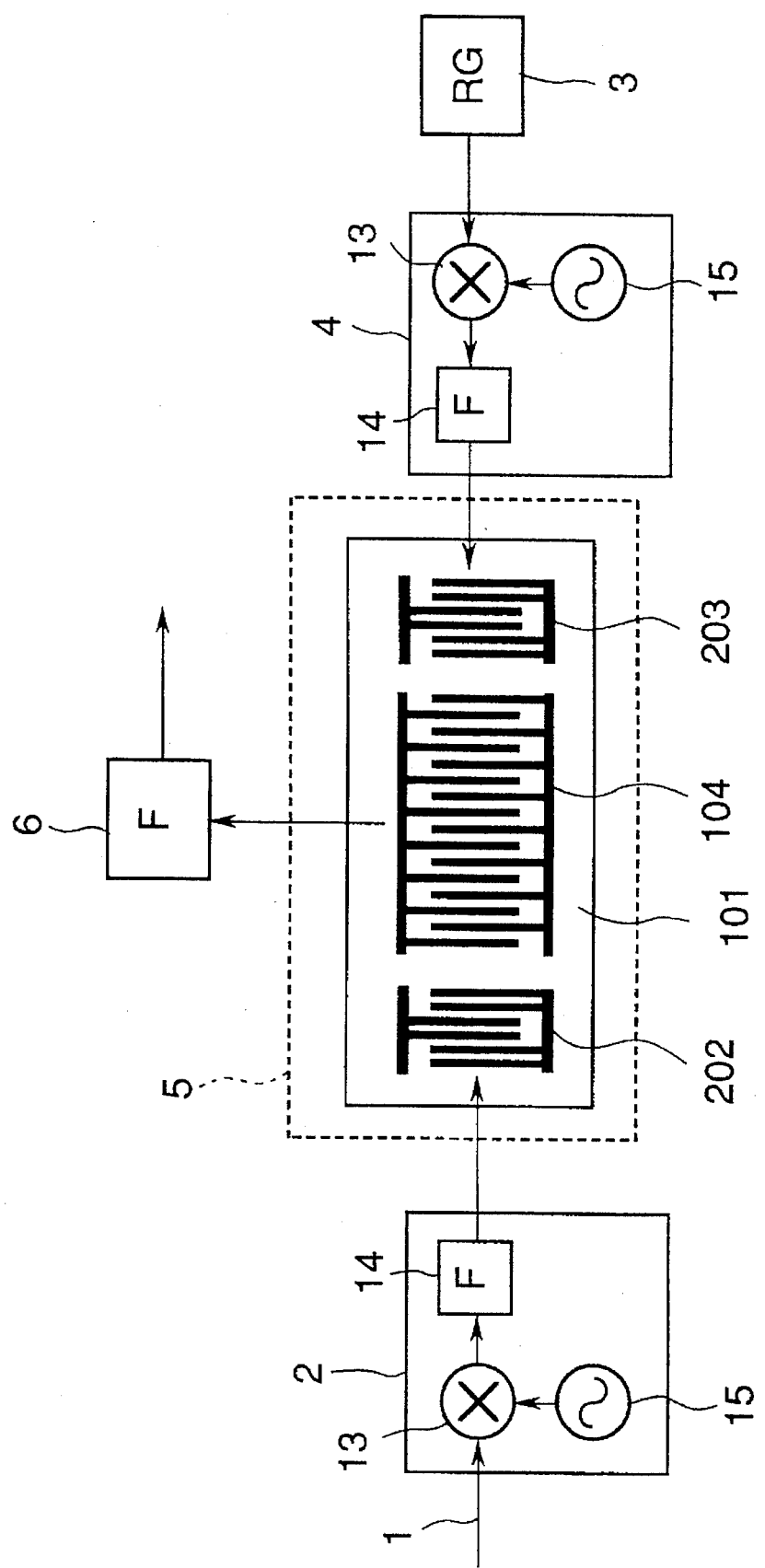
FIG. 6 is a schematic diagram showing the third embodiment of a demodulation apparatus according to the present invention.

FIG. 6 is a diagram showing the third embodiment of the present invention. The same reference numerals in FIG. 6 denote the same parts as in FIGS. 3 and 5. The arrangement of this embodiment is substantially the same as that of the first embodiment, except that first and second excitation electrodes 202 and 203 of the elastic surface wave element 5 comprise double electrodes (split electrodes), and the pitch $p_i$ of the electrodes is substantially equal to v/4f, i.e., the electrode pitch of the acousto-electric converter 104.

In this embodiment, since the first and second excitation electrodes 202 and 203 of the elastic surface wave element 5 comprise double electrodes, and the electrode pitch $p_i$ is set to be v/4f, the input center frequency is f as in the first embodiment, and the same effect as in the first embodiment can be obtained. Furthermore, in this embodiment, since the double electrode structure is adopted, reflection of elastic surface waves is suppressed in the first and second excitation electrodes 202 and 203, and spurious signal components are eliminated.

The first and second excitation electrodes need only have a structure which can efficiently convert an electrical signal of the input center frequency f into an elastic surface wave, and may comprise unidirectional electrodes.

[Fourth Embodiment]

Figure 7:
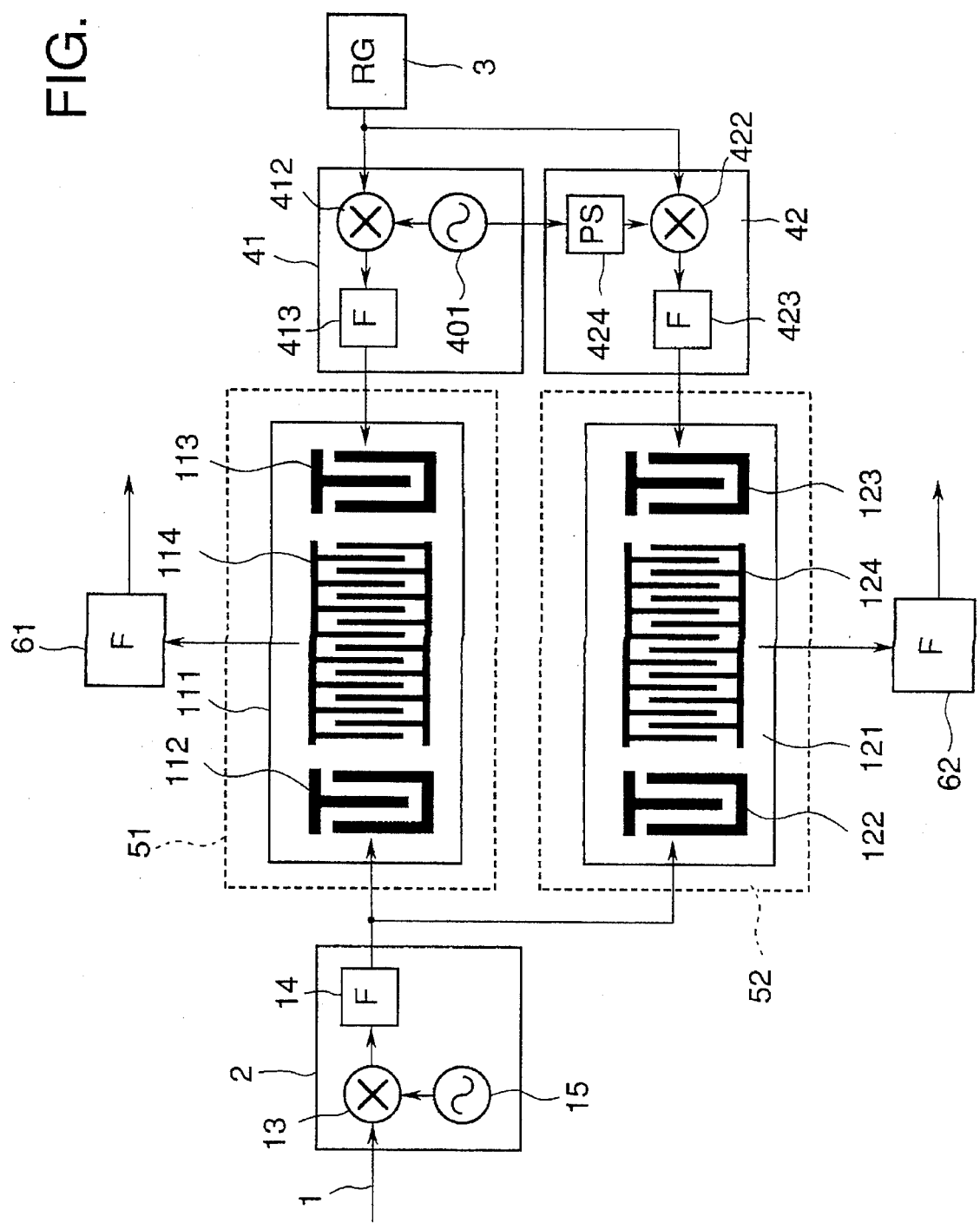
FIG. 7 is a schematic diagram showing the fourth embodiment of a demodulation apparatus according to the present invention.

FIG. 7 is a diagram showing the fourth embodiment of the present invention. The same reference numerals in FIG. 7 denote the same parts as in FIGS. 3 to 6. In this embodiment, first and second elastic surface wave elements 51 and 52 are arranged. An output from the reference signal generator 3 is divided into two signals, and these signals are input to a second excitation electrode 113 of the first elastic surface wave element 51 and a second excitation electrode 123 of the second elastic surface wave element 52 via second and third frequency converters 41 and respectively. In the third frequency converter 42, a signal from an oscillator 401 common to the second frequency converter 41 is input to a multiplier 422 via a 90° phase shifter (PS) 424. A received signal 1 is frequency-converted by the first frequency converter 2, and is then divided into two signals. These two signals are input to a first excitation electrode 112 of the first elastic surface wave element 51 and a first excitation electrode 122 of the second elastic surface wave element 52.

In this embodiment, the divided signals of the received signal 1 are input to the first excitation electrodes 112 and 122 of the first and second elastic surface wave elements 51 and 52 to be in phase with each other, while the divided signals of the output from the reference signal generator 3 are input to the second excitation electrodes 113 and 123 of the first and second elastic surface wave elements 51 and 52 to have a 90° phase difference therebetween. For this reason, since a signal having a carrier frequency=0 and a wave number=4πf/v generated on a substrate 111 of the first elastic surface wave element 51 has a 90° phase difference from a signal having a carrier frequency=0 and a wave number= 4πf/v generated on a substrate 121 of the second elastic surface wave element 52, the outputs from two acousto-electric converters 114 and 124 have a 90° phase difference therebetween, i.e., have a relationship between SIN and COS components.

Thus, data can be easily demodulated after the outputs from the acousto-electric converters 114 and 124 of the first and second elastic surface wave elements 51 and 52 are filtered through filters (F) 61 and 62.

In this embodiment, the output from the reference signal generator 3 is divided into two signals, and the two signals are phase-shifted by 90°. Alternatively, the received signal 1 may be divided into two signals, and the two signals may be phase-shifted by 90°. The first and second elastic surface wave elements 51 and 52 may be formed on a single substrate, and the first excitation electrodes 112 and 122 or the second excitation electrodes 113 and 123 may be integrally formed.

[Fifth Embodiment]

Figure 8:
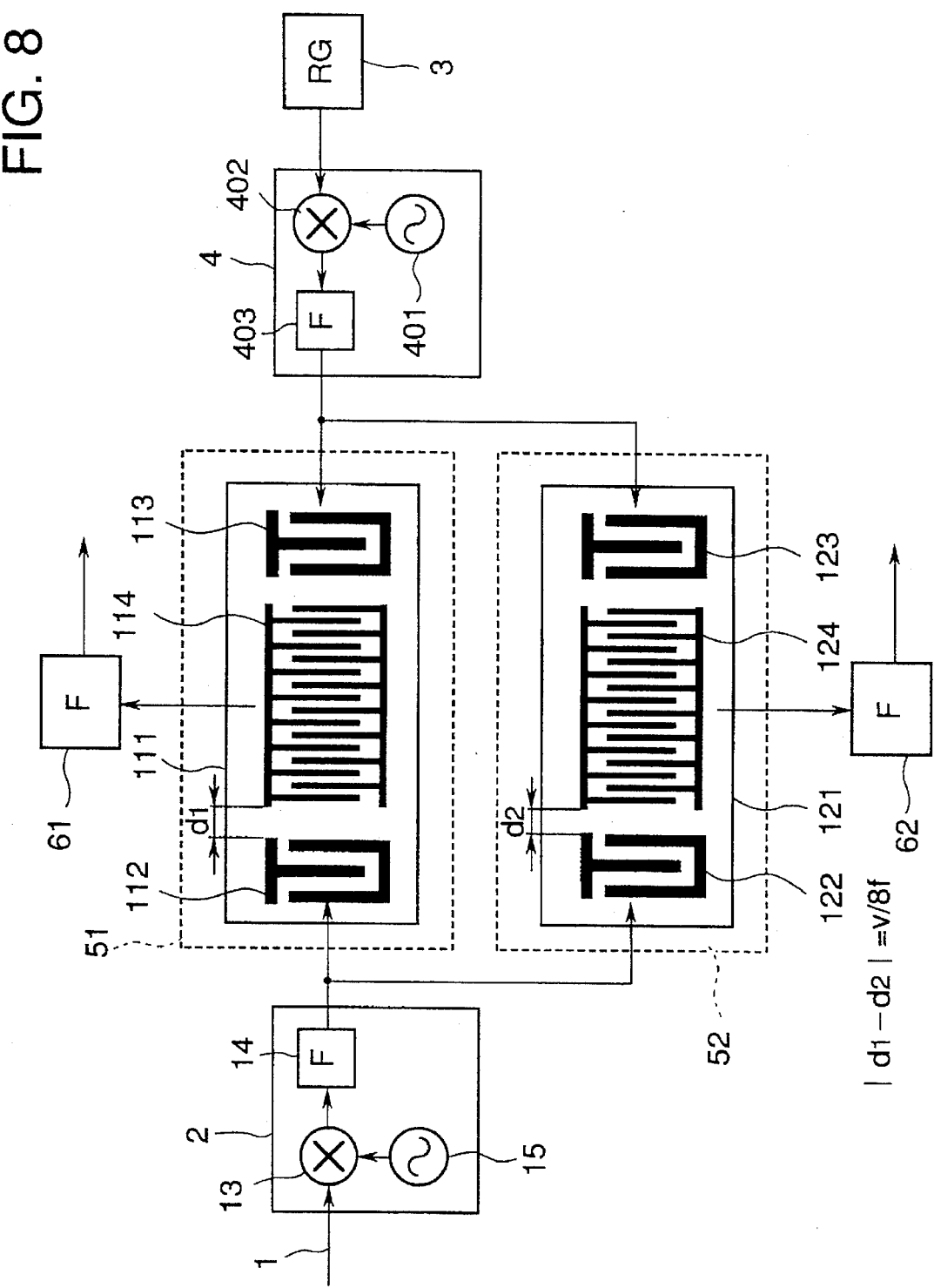
FIG. 8 is a schematic diagram showing the fifth embodiment of a demodulation apparatus according to the present invention.

FIG. 8 is a diagram showing the fifth embodiment of the present invention. The same reference numerals in FIG. 8 denote the same parts as in FIGS. 3 to 7. In this embodiment, the first and second elastic surface wave elements 51 and 52 are arranged, and the arrangement of electrode fingers of an IDT constituting the acousto-electric converter 124 of the second elastic surface wave element 52 is shifted from that of the acousto-electric converter 114 of the first elastic surface wave element 51 by v/8f in the propagation direction of an elastic surface wave (i.e., $|d_1-d_2|=v/8f$).

In this embodiment, the received signal 1 is frequency-converted by the first frequency converter 2, and is then divided into two signals. Thereafter, the two signals are respectively input to the first excitation electrodes 112 and 122 of the first and second elastic surface wave elements 51 and 52. The output from the reference signal generator 3 is frequency-converted by the second frequency converter 4, and is then divided into two signals. Thereafter, the two signals are respectively input to the second excitation electrodes 113 and 123 of the first and second elastic surface wave elements 51 and 52. Since the acousto-electric converters 114 and 124 of the first and second elastic surface wave elements 51 and 52 are formed to be shifted from each other by v/8f in the propagation direction of an elastic surface wave, signals each having a carrier frequency=0 and a wave number=4πf/v generated on the substrates are extracted after they are being shifted by one wavelength, i.e., SIN and COS components are extracted.

Therefore, data can be easily demodulated after the outputs from the acousto-electric converters 114 and 124 of the first and second elastic surface wave elements 51 and 52 are filtered through the filters 61 and 62.

Figure 9:
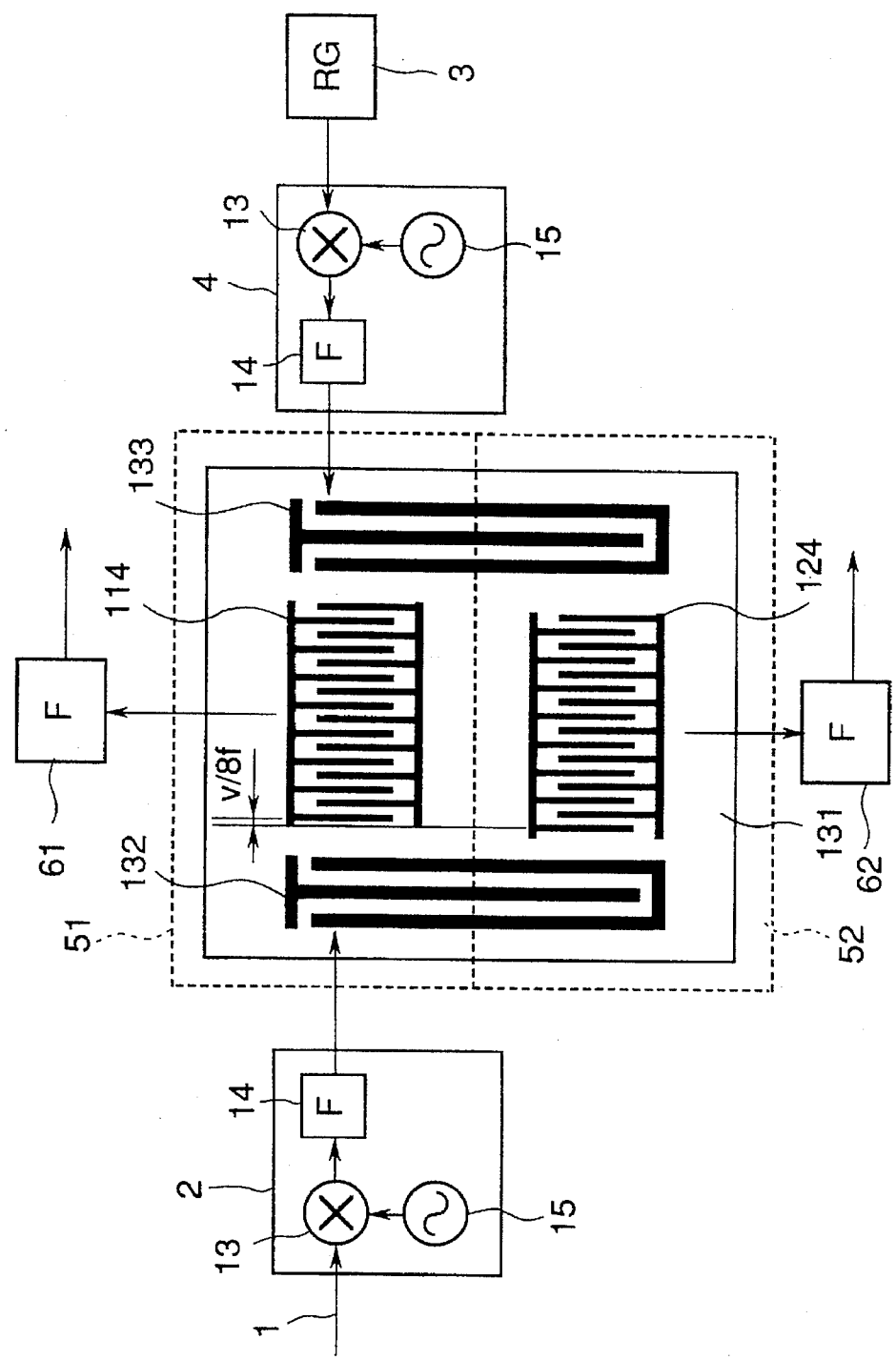
FIG. 9 is a schematic diagram showing a modification of the fifth embodiment of a demodulation apparatus according to the present invention.

In this embodiment, as shown in FIG. 9, the first and second elastic surface wave elements 51 and 52 may be formed on a single substrate 131, and the two first excitation electrodes of these elements may be integrated as an electrode 132 and/or the two second excitation electrodes of these elements may be integrated as an electrode 133.

[Sixth Embodiment]

Figure 10:
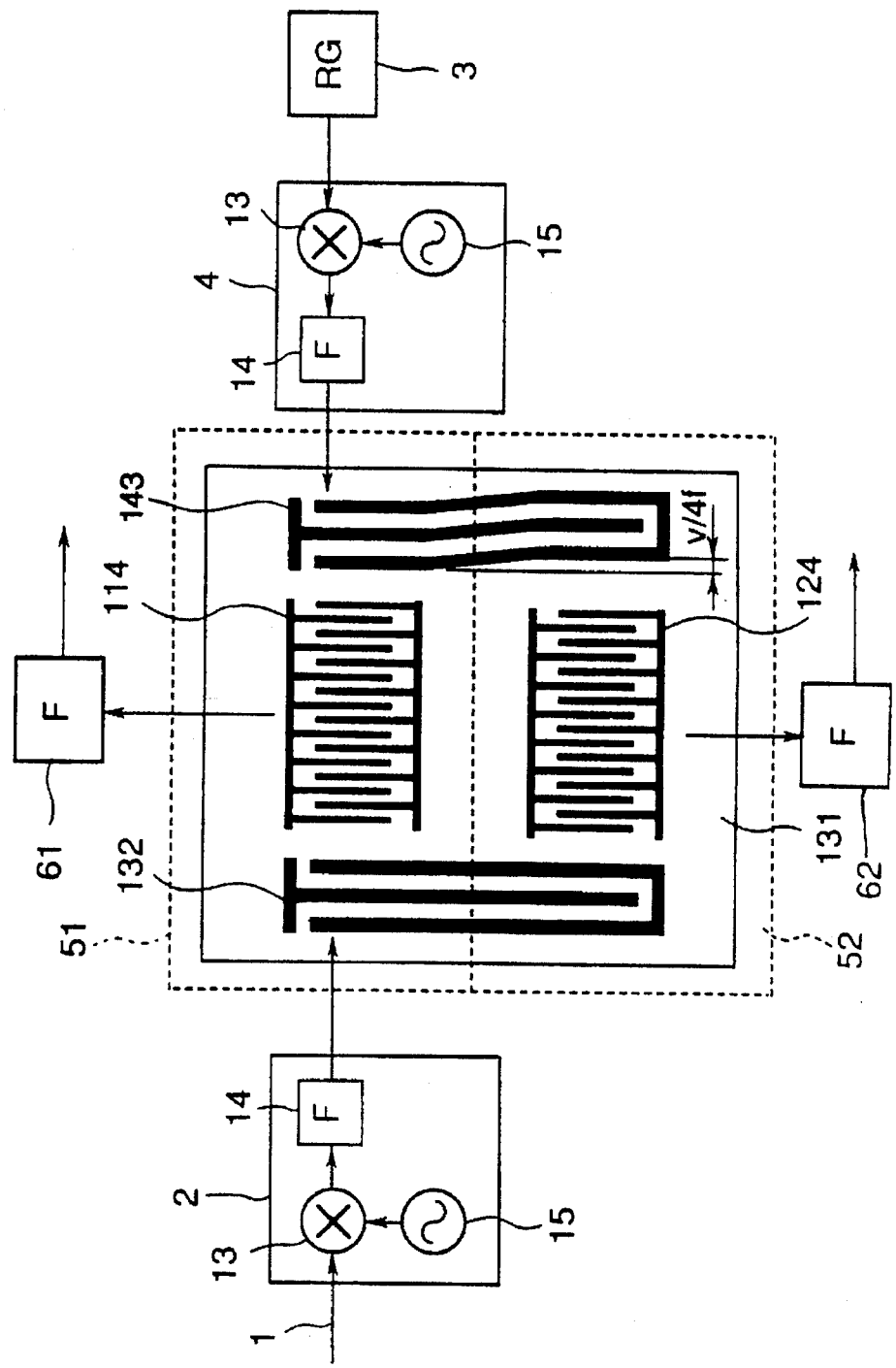
FIG. 10 schematic diagram showing the sixth embodiment of a demodulation apparatus according to the present invention.

FIG. 10 is a diagram showing the sixth embodiment of the present invention. The same reference numerals in FIG. 10 denote the same parts as in FIGS. 3 to 9. In this embodiment, the first and second elastic surface wave elements 51 and 52 are formed on the single substrate 131, the two first excitation electrodes of the first and second elastic surface wave elements 51 and 52 are integrated as the electrode 132, and the two second excitation electrodes of the first and second elastic surface wave elements 51 and 52 are integrated as an electrode 143. Furthermore, the arrangement of the second excitation electrode of the second elastic surface wave element 52 is shifted by v/4f from that of the first excitation electrode of the first elastic surface wave element 51 in the propagation direction of an elastic surface wave.

In this embodiment, a received signal 1 is frequency-converted by the first frequency converter 2, and is then input to the first excitation electrode 132 of the first and second elastic surface wave elements 51 and 52. The output from the reference signal generator 3 is frequency-converted by the second frequency converter 4, and is then input to the second excitation electrode 143 of the first and second elastic surface wave elements 51 and 52. Since the second excitation electrode portion of the first elastic surface wave element 51 is formed to be shifted from the second excitation electrode portion of the second elastic surface wave element 52 by v/4f in the propagation direction of an elastic surface wave, an elastic surface wave generated by the excitation electrode of the element 51 has a 90° phase difference from an elastic surface wave generated by the excitation electrode of the element 52. Therefore, a signal having a carrier frequency=0 and a wave number =4πf/v generated at the first elastic surface wave element 51 side, and a signal having a carrier frequency=0 and a wave number=4πf/v generated at the second elastic surface wave element 52 side have a 90° phase difference therebetween, and when these signals are extracted by the acousto-electric converters 114 and 124, SIN and COS components are extracted.

Therefore, data can be easily demodulated after the outputs from the acousto-electric converters 114 and 124 of the first and second elastic surface wave elements 51 and 52 are filtered through the filters 61 and 62.

In this embodiment, the first and second elastic surface wave elements 51 and 52 are formed on a single substrate, but may be formed on separate substrates. In this embodiment, the second excitation electrode portions of the first and second elastic surface wave elements are arranged to be shifted from each other by v/4f. Alternatively, the first excitation electrode portions may be arranged to be shifted from each other by v/4f. Furthermore, the first and second excitation electrode portions may be arranged to be properly shifted from each other, so that signals each having a carrier frequency=0 and a wave number=4πf/v generated on the substrate on the sides of the first and second elastic surface wave elements 51 and 52 have a 90° phase difference therebetween.

In the first to sixth embodiments described above, the substrates 101, 111, 121, and 131 may consist of a piezo-electric single crystal such as lithium niobate. However, the present invention is not limited to this. For example, a material and structure which can exhibit the parametric mixing effect, such as a structure obtained by adding a piezoelectric film on the surface of a semiconductor or glass substrate, or the like, may be used. Also, an elastic surface wave waveguide may be formed on the substrate to facilitate propagation of an elastic surface wave.

In the fourth to sixth embodiments, the excitation electrodes 112, 122, 113, 123, 132, 133, and 143 may comprise double electrodes or unidirectional electrodes.

Figure 11:
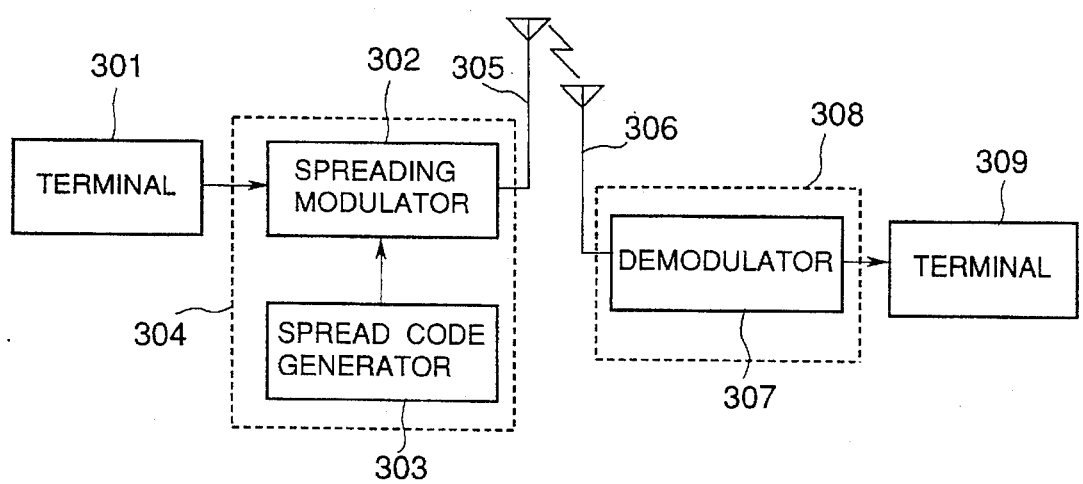
FIG. 11 is a schematic diagram showing an embodiment of a communication system using a demodulation apparatus of the present invention.

FIG. 11 is a diagram showing an embodiment of a spread spectrum communication system adopting a demodulation apparatus of the present invention. Referring to FIG. 11, an information signal output from a terminal 301 is spreading-modulated by spread codes generated by a spread code generator 303 in a spreading modulator 302 in a transmitter 304. The spreading-modulated signal is transmitted from the transmitter 304 via an antenna 305.

The signal transmitted from the transmitter 304 is received by a receiver 308 via an antenna 306. The received signal is demodulated by a demodulator 307 in the receiver 308, and the demodulated information signal is input to a terminal 309. The demodulator 307 has one of the above-mentioned arrangements shown in FIG. 3 and FIGS. 5 to 10.

Figure 12:
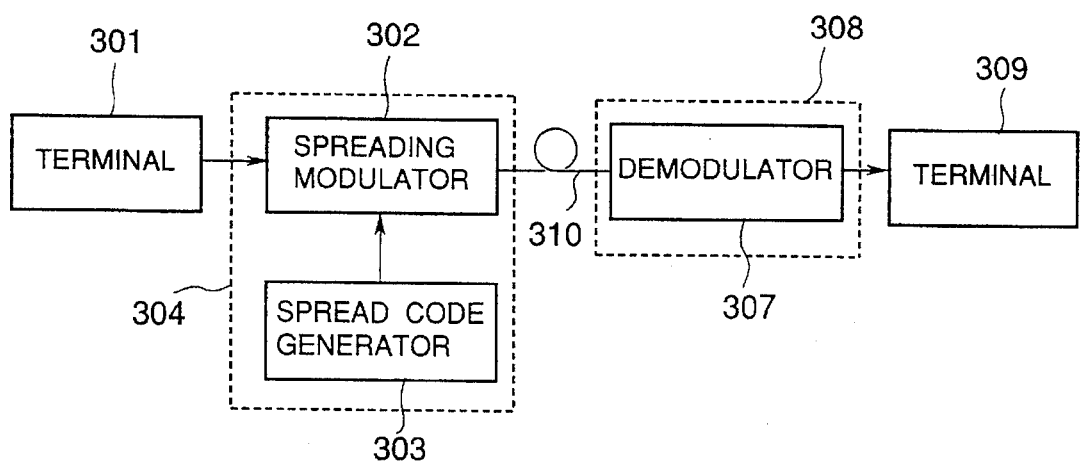
FIG. 12 is a schematic diagram showing another embodiment of a communication system using a demodulation apparatus of the present invention.

FIG. 12 is a diagram showing another embodiment of a spread spectrum communication system using a demodulation apparatus of the present invention. The same reference numerals in FIG. 12 denote the same parts as in FIG. 11, and a detailed description thereof will be omitted. The communication system shown in FIG. 12 is substantially the same as that shown in FIG. 11, except that a signal is transmitted from the transmitter 304 to the receiver 308 via a cable 310 in place of the antennas in FIG. 11. In this system, modulation and demodulation of a signal are performed in the same manner as in FIG. 11.

The present invention allows various other applications in addition to the above-mentioned embodiments. The present invention incorporates all these applications without departing from the scope of claims.

What is claimed is:

1. A demodulation apparatus comprising:
   code generation means for generating a reference spread code corresponding to a first signal modulated by a spread code; and an elastic surface wave element for receiving the first signal and a second signal output from said code generation means, and outputting a demodulated information signal;

said elastic surface wave element comprising:
a piezoelectric substrate;
a first excitation electrode, formed on said piezoelectric substrate, for generating a first elastic surface wave which propagates in a predetermined direction in accordance with the first signal;
a second excitation electrode, formed on said piezoelectric substrate, for generating a second elastic surface wave which propagates in a direction opposite to the predetermined direction in accordance with the second signal;
phase shifter means for controlling a phase of at least one of the first and the second elastic surface waves; and
an acousto-electric converter, formed between said first and second excitation electrodes on said piezoelectric substrate for outputting a convolution signal of the first and second signals on the basis of the first and second elastic surface waves, said acousto-electric converter including an interdigital transducer which is constructed by a plurality of electrode fingers extending in a direction transverse to the propagation directions of the first and second elastic surface waves and being constituted to selectively convert an elastic surface wave having a wave number twice a wave number of the first and second elastic surface waves into an electrical signal.

2. An apparatus according to claim 1, wherein said first and second excitation electrodes respectively comprise interdigital transducers each of which has electrode fingers arranged at a predetermined pitch, and said acousto-electric converter comprises an interdigital transducer which has electrode fingers arranged at a pitch half the predetermined pitch.

3. An apparatus according to claim 1, wherein said first and second excitation electrodes respectively comprise interdigital transducers each of which has double-electrode fingers arranged at a predetermined pitch, and said acousto-electric converter comprises an interdigital transducer which has single-electrode fingers arranged at the predetermined pitch.

4. An apparatus according to claim 1, wherein said phase shifter means comprises means for controlling a phase of at least one of the first and second signals so as to control the phase of the at least one of the first and second elastic surface waves.

5. A demodulation apparatus comprising:
code generation means for generating a reference spread code corresponding to a first signal modulated by a spread code;
a first elastic surface wave element for receiving the first signal and a second signal output from said code generation means, and outputting a first demodulated information signal; and
a second elastic surface wave element for receiving the first signal and the second signal output from said code generation means, and outputting a second demodulated information signal, each of said first and second elastic surface wave elements comprising:
a piezoelectric substrate;
a first excitation electrode, formed on said piezoelectric substrate, for generating a first elastic surface wave which propagates in a predetermined direction in accordance with the first signal;
a second excitation electrode, formed on said piezoelectric substrate, for generating a second elastic surface wave which propagates in a direction opposite to the predetermined direction in accordance with the second signal; and
an acousto-electric converter, formed between said first and second excitation electrodes on said piezoelectric substrate and constituted so as to selectively convert an elastic surface wave having a wave number twice a wave number of the first and second elastic surface waves into an electrical signal and for outputting a convolution signal of the first and second signals on the basis of the first and second elastic surface waves, wherein a phase difference is produced in at least one of between the first elastic surface wave input to said acousto-electric converter of the first elastic surface wave element and the first elastic surface wave input to said acousto-electric converter of the second elastic surface wave element, and between the second elastic surface wave input to said acousto-electric converter of the first elastic surface wave element and the second elastic surface wave input to said acousto-electric converter of the second elastic surface wave element.

6. An apparatus according to claim 5, wherein said first and second excitation electrodes respectively comprise interdigital transducers each of which has electrode fingers arranged at a predetermined pitch, and said acousto-electric converter comprises an interdigital transducer which has electrode fingers arranged at a pitch half the predetermined pitch.

7. An apparatus according to claim 5, wherein the phase difference is produced by phase shifter means for changing at least one of a phase relationship between the first signal input to said first elastic surface wave element and the first signal input to said second elastic surface wave element, and a phase relationship between the second signal input to said first elastic surface wave element and the second signal input to said second elastic surface wave element.

8. An apparatus according to claim 5, wherein the phase difference is produced by said acoustic-electric converter of said first elastic surface wave element being shifted by v/8f from said acousto-electric converter of said second elastic surface wave element in a direction parallel to the propagation directions of the first and second elastic surface waves, where v is the propagation speed of each of the first and second elastic surface waves, and f is the center frequency of the first and second signals.

9. An apparatus according to claim 5, wherein the phase difference is produced by an arrangement of one of said first and second excitation electrodes with respect to said acousto-electric converter in said first elastic surface wave element being shifted by v/4f from an arrangement of one of said first and second excitation electrodes with respect to said acousto-electric converter in said second elastic surface wave element in a direction parallel to the propagation directions of the first and second elastic surface waves, where v is the propagation speed of each of the first and second elastic surface waves, and f is the center frequency of the first and second signals.

10. An apparatus according to claim 5, wherein said piezoelectric substrate of said first elastic surface wave element is formed integrally with said piezoelectric substrate of said second elastic surface wave element.

11. A communication system comprising:
a transmitter for transmitting a first signal modulated by a spread code;
a receiver for receiving the first signal transmitted from said transmitter;
code generation means for generating a reference spread code corresponding to the first signal; and
an elastic surface wave element for receiving the first signal received by said receiver, and a second signal output from said code generation means, and outputting a demodulated information signal,
said electric surface wave element comprising:
a piezoelectric substrate;
a first excitation electrode, formed on said piezoelectric substrate, for generating a first elastic surface wave which propagates in a predetermined direction in accordance with the first signal;
a second excitation electrode, formed on said piezoelectric substrate, for generating a second elastic surface wave which propagates in a direction opposite to the predetermined direction in accordance with the second signal;
phase shifter means for controlling a phase of at least one of the first and the second elastic surface waves; and
an acousto-electric converter, formed between said first and second excitation electrodes on said piezoelectric substrate for outputting a convolution signal of the first and second signals on the basis of the first and second elastic surface waves, said acousto-electric converter including an interdigital transducer which is constructed by a plurality of electrode fingers extending in a direction transverse to the propagation directions of the first and second elastic surface waves and being constituted to selectively convert an elastic surface wave having a wave number twice a wave number of the first and second elastic surface waves into an electrical signal.

12. A system according to claim 11, wherein said first and second excitation electrodes respectively comprise interdigital transducers each of which has electrode fingers arranged at a predetermined pitch, and said acousto-electric converter comprises an interdigital transducer which has electrode fingers arranged at a pitch half the predetermined pitch.

13. A system according to claim 11, wherein said first and second excitation electrodes respectively comprise interdigital transducers each of which has double-electrode fingers arranged at a predetermined pitch, and said acousto-electric converter comprises an interdigital transducer which has single-electrode fingers arranged at the predetermined pitch.

14. A system according to claim 11, wherein said phase shifter means comprises means for controlling a phase of at least one of the first and second signals so as to control the phase of the at least one of the first and second elastic surface waves.

15. A system according to claim 11, further comprising a first terminal for supplying an information signal to said transmitter, and a second terminal for receiving the demodulated information signal output from said elastic surface wave element.

16. A communication system comprising:
a transmitter for transmitting a first signal modulated by a spread code;
a receiver for receiving the first signal transmitted from said transmitter;
code generation means for generating a reference spread code corresponding to the first signal;
a first elastic surface wave element for receiving the first signal received by said receiver, and a second signal output from said code generation means, and outputting a first demodulated information signal; and
a second elastic surface wave element for receiving the first signal received by said receiver, and the second signal output from said code generation means, and outputting a second demodulated information signal,
each of said first and second elastic surface wave elements comprising:
a piezoelectric substrate;
a first excitation electrode, formed on said piezoelectric substrate, for generating a first elastic surface wave which propagates in a predetermined direction in accordance with the first signal;
a second excitation electrode, formed on said piezoelectric substrate, for generating a second elastic surface wave which propagates in a direction opposite to the predetermined direction in accordance with the second signal; and
an acousto-electric converter, formed between said first and second excitation electrodes on said piezoelectric substrate and constituted so as to selectively convert an elastic surface wave having a wave number twice a wave number of the first and second elastic surface waves into an electrical signal, for outputting a convolution signal of the first and second signals on the basis of the first and second elastic surface waves,
wherein a phase difference is produced in said receiver in at least one of between the first elastic surface wave input to said acousto-electric converter of the first elastic surface wave element and the first elastic surface wave element input to said acousto-electric converter of the second elastic surface wave element and between the second elastic surface wave input to said acousto-electric converter of the first elastic surface wave element and the second elastic surface wave input to said acousto-electric converter of the second elastic surface wave element.

17. A system according to claim 16, wherein said first and second excitation electrodes respectively comprise interdigital transducers each of which has electrode fingers arranged at a predetermined pitch, and said acousto-electric converter comprises an interdigital transducer which has electrode fingers arranged at a pitch half the predetermined pitch.

18. A system according to claim 16, wherein the phase difference is produced by phase shifter means for changing at least one of a phase relationship between the first signal input to said first elastic surface wave element and the first signal input to said second elastic surface wave element, and a phase relationship between the second signal input to said first elastic surface wave element and the second signal input to said second elastic surface wave element.

19. A system according to claim 16, wherein the phase difference is produced by said acousto-electric converter of said first elastic surface wave element being shifted by v/8f from said acousto-electric converter of said second elastic surface wave element in a direction parallel to the propagation directions of the first and second elastic surface waves, where v is the propagation speed of each of the first and second elastic surface waves, and f is the center frequency of the first and second signals.

20. A system according to claim 16, wherein the phase difference is produced by an arrangement of one of said first and second excitation electrodes with respect to said acousto-electric converter in said first elastic surface wave element being shifted by v/4f from an arrangement of one of said first and second excitation electrodes with respect to said acousto-electric converter in said second elastic surface wave element in a direction parallel to the propagation directions of the first and second elastic surface waves, where v is the propagation speed of each of the first and second elastic surface waves, and f is the center frequency of the first and second signals.

21. A system according to claim 16, further comprising a first terminal for supplying an information signal to said transmitter, and a second terminal for receiving the demodulated information signals output from said first and second elastic surface wave elements.

* * * * *

UNITED STATES PATENT AND TRADEMARK OFFICE
CERTIFICATE OF CORRECTION

PATENT NO. : 5,661,358
DATED : August 26, 1997
INVENTOR(S) : Mochizuki

It is certified that error appears in the above-identified patent and that said Letters Patent is hereby corrected as shown below:

COLUMN 1:

Line 10, "releases" should read --relates--.

COLUMN 5:

Line 36, "FIG. 10" should read --FIG. 10 is a--.

COLUMN 8:

Line 22, "and" should read --and 42,--.

Signed and Sealed this

Twenty-fourth Day of March, 1998

Attest:

BRUCE LEHMAN

Attesting Officer

Commissioner of Patents and Trademarks